I. Buckman, Jr.

Refrigerator.

N° 88,442. Patented Mar. 30, 1869.

Witnesses;
J. B. Woodruff
Edw. F. Brown

Inventor;
Ira Buckman Jr.

N. PETERS, PHOTO-LITHOGRAPHER, WASHINGTON, D. C.

UNITED STATES PATENT OFFICE.

IRA BUCKMAN, JR., OF WILLIAMSBURG, NEW YORK.

Letters Patent No. 88,442, dated March 30, 1869.

IMPROVED REFRIGERATOR AND WEIGHING-APPARATUS.

The Schedule referred to in these Letters Patent and making part of the same.

*To all whom it may concern:*

Be it known that I, IRA BUCKMAN, Jr., of Williamsburg, in the county of Kings, and State of New York, have invented certain new and useful Improvements in Combining a Refrigerator with a Weighing and Indicating-Apparatus; and the following is a full, clear, and exact description of the same, reference being had to the accompanying drawings, making a part of this specification, in which—

Figure 1:
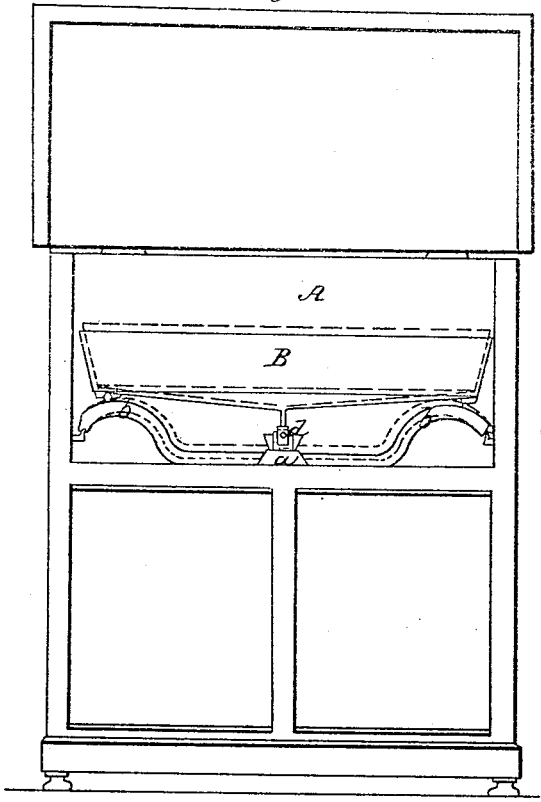
Figure 1 represents an open front view of the refrigerator, showing the detached ice-box, or receiver, and the weighing mechanical appliances, the position, when in the act of weighing, being shown in red lines.
Figure 2:
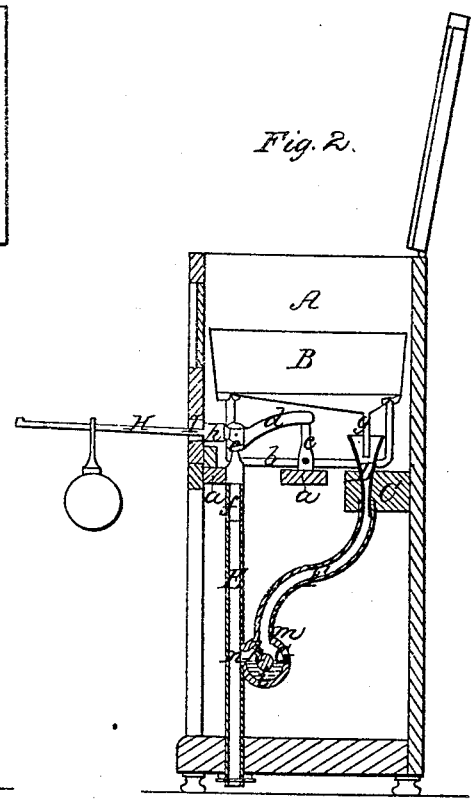
Figure 2 shows an end view vertical section through the centre of the refrigerator, detached ice-box, weighing mechanical appliances, flexible tube, trap, and beam-standard, which connects with the trap, and forms the double purpose of the post and drain-pipe.

The object of my invention is to connect and combine two important articles of use in housekeeping, and to provide a most sure and ever-ready means and convenient mode of weighing all articles of food, such as meats, vegetables, fruits, &c., which are procured in market, and which are desirable to be kept in a refrigerator; and is also convenient for weighing groceries, or anything else, in ordinary quantities, which are required for family use.

My invention consists in combining a refrigerator with a platform weighing-apparatus, detached ice-box, flexible tube, trap, and beam-standard, and the means of closing the aperture in which the scale-beam is inserted, air-tight, when the beam is removed.

To enable others to make and use my invention, I will describe it more in detail, referring to the drawings, and to the letters marked thereon.

The refrigerator A may be of any kind now in use, or constructed in any desirable manner.

There may be blocks, or girders, $a\ a$, placed in a suitable position to support the fulcrum-levers $b\ b$, on which the detached ice-box B is supported at the four corners, in the same manner as ordinary platform-scales.

The compound lever, $d$, which connects with the levers, $b\ b$, by a link, $c'$, is supported in an adjustable head, $e$, which is provided with a stem, $f$, to fit into a pipe, E, placed vertically in or near the central front part of the refrigerator, in the rear of which is placed a block of wood, C, to support a funnel, D, directly under the small pipe $g$, in the sunken portion of the bottom of the detached ice-box B, whose sides extend below the bottom, to carry off the drippings, if any there be.

The drippings of the melting ice are conveyed into a flexible tube, F, which connects the funnel D with a water or air-trap, G, which is secured to the rear side of the vertical pipe-standard E, so that the drainage may be constant, without admitting any air into the refrigerator, or ice-box B, which is entirely detached from the sides of the case, or refrigerator A, and rests on pins and steel plates, at the four corners, in the levers $b\ b$, thus forming the platform or receiver for anything to be weighed.

All of the connections, and the bearings of the weighing-apparatus, may be made of anti-corrosive material, so that they will be durable, and be in condition to operate freely, and indicate the weight of either large or small articles correctly.

The scale-beam H is made detachable by being fitted into a socket, $h$, in the compound lever $d$, and when desirable for weighing, it is instantly inserted in its place, and when the refrigerator is closed air-tight, the scale-beam is taken out, and the aperture I, through the case, is provided with a cover, or escutcheon J, which is backed with India rubber, $i$, or leather, or any other flexible material to form a sufficient packing to exclude the air.

The scale-beam may be constructed with a rule-joint, so as to fold up, within the line of the case, and the opening covered in a similar manner.

Figure 3:
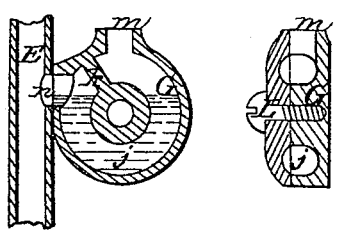
Figure 3 shows a detached view of the trap, and the mode of constructing the same, with two views, face and edge.
Figure 4:
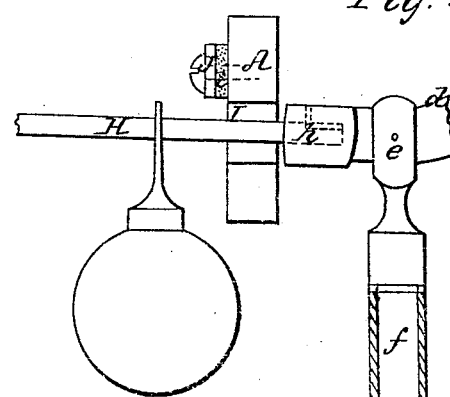
Figure 4 shows two broken-off sections, through which the aperture is made, to receive the scale-beam and the cover for closing it air-tight, front and sectional views.
Figure 4:
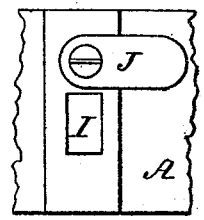

The water and air-trap G, as shown in an enlarged view in the fig. 3, is constructed in the most simple manner, being made complete by a single casting, with a division, $k$, between the induction and eduction-pipes $m$ and $n$, in the circular hollow J, and a face-cap, K, secured to it by a single screw, L, in the centre; or a bolt and nut may be used, if desirable.

A very good water-trap, for excluding the air, may be formed by a curve, or bend in the flexible pipe.

The flexible pipe F may be easily removed from the tube D and trap G, for cleaning out any obstructions that may get into it, and as easily replaced.

It will readily be seen, that with my plan of combining a weighing-apparatus with a refrigerator, a most economical and useful improvement is obtained, will always be in readiness for use, does not occupy room, or space which can be made very available for other purposes, and will enable housekeepers to readily ascertain the weight of any article they have purchased, it not being necessary to remove anything from the detached ice-box, but simply to observe or balance the contents therein contained, and then add the weight of each article laid therein as it is weighed, the scale-beam being graduated for the weighing of such quantities as are ordinarily procured; but when it is necessary to weigh a larger quantity, it is effected by using a larger poise, or weight at the end of the beam.

What I claim as my invention, and desire to secure by Letters Patent, is—

1. A detached movable ice-box, within a refrigerator-case, in combination with a weighing-apparatus, substantially as and for the purposes described.

2. The funnel-shaped tube D, the flexible tube F, and trap G, constructed as described, for conducting off the water, substantially as and for the purposes herein set forth.

IRA BUCKMAN, JR.

Witnesses:
    J. B. WOODRUFF,
    EDM. F. BROWN.